US012749820B2

(12) United States Patent
Bai et al.

(10) Patent No.: US 12,749,820 B2
(45) Date of Patent: Sep. 29, 2026

(54) MAGNETO-ELECTRIC DIPOLE ANTENNA AND ANTENNA ARRAY USING THE SAME

(71) Applicant: Alpha Networks Inc., Hsinchu (TW)

(72) Inventors: Ta-Chuan Bai, Hsinchu (TW); Ding-Bing Lin, Hsinchu (TW); Sung-Nien Hsieh, Hsinchu (TW); Meng-Zhe Wu, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 36 days.

(21) Appl. No.: 18/954,990

(22) Filed: Nov. 21, 2024

(65) Prior Publication Data

US 2026/0024922 A1 Jan. 22, 2026

(30) Foreign Application Priority Data

Jul. 22, 2024 (TW) ................................ 113127366

(51) Int. Cl.
*H01Q 19/10* (2006.01)
*H01Q 1/48* (2006.01)
*H01Q 21/00* (2006.01)

(52) U.S. Cl.
CPC ............ *H01Q 19/108* (2013.01); *H01Q 1/48* (2013.01); *H01Q 21/0006* (2013.01)

(58) Field of Classification Search
CPC .... H01Q 19/108; H01Q 1/48; H01Q 21/0006; H01Q 21/062; H01Q 21/26; H01Q 9/28
See application file for complete search history.

(56) References Cited

FOREIGN PATENT DOCUMENTS

| | | |
|---|---|---|
| CN | 101080845 A | 11/2007 |
| CN | 112117534 B | 9/2022 |
| CN | 118017203 A | 5/2024 |
| TW | I688163 B | 3/2020 |

OTHER PUBLICATIONS

Hend Abd El-Azem Malhat1 • Anas Saber Zainud-Deen, Dual/circular polarization beam shaping of time-modulated plasma-based magneto-electric dipole antenna arrays, Optical and Quantum Electronics (Year: 2021).*
Antenna array (Year: 2021).*
(Continued)

*Primary Examiner* — David E Lotter
(74) *Attorney, Agent, or Firm* — HSML P.C.

(57) ABSTRACT

A magneto-electric dipole antenna includes a substrate module, a director, a reflector and a feeding module. The substrate module has an upper surface and a lower surface. The director is disposed on the upper surface of the substrate module. The reflector is disposed on the lower surface of the substrate module. The feeding module is disposed in the substrate module between the director and the reflector. When a to-be-outputted signal is fed to the feeding module, a forward radiation that transmits in a forward direction pointing from bottom to top is generated, a backward radiation that transmits in a backward direction reverse to the forward direction is generated and is reflected by the reflector, and the forward radiation and the backward radiation thus reflected are directed by the director so as to generate the electromagnetic wave.

7 Claims, 15 Drawing Sheets

(56) References Cited

OTHER PUBLICATIONS

Search Report issued to European counterpart application No. 24216585.0 by the EPO on May 13, 2025 (14 pages).
L. X. Wu et al., "Millimeter-Wave Wideband Dual-Polarized Aperture-Coupled Magnetoelectric Dipole Antenna Array With High Isolation," IEEE Transactions on Antennas and Propagation, vol. 72, No. 3, 2024, pp. 2304-2313.
C. H. Le Thi et al., "Design of compact broadband dual-polarized antenna for 5G applications," International Journal of RF and Microwave Computer-Aided Engineering, vol. 31, No. 5, 2021 (13 pages).
A. Dadgarpour et al., "A Dual-Polarized Magnetoelectric Dipole Array Based on Printed Ridge Gap Waveguide With Dual-Polarized Split-Ring Resonator Lens," IEEE Transactions on Antennas and Propagation, vol. 68, No. 5, 2020, pp. 3578-3585.
Search Report appended to an Office Action, which was issued to Taiwanese counterpart application No. 113127366 by the TIPO on May 13, 2025, with an English translation thereof.

* cited by examiner

MAGNETO-ELECTRIC DIPOLE ANTENNA AND ANTENNA ARRAY USING THE SAME

CROSS-REFERENCE TO RELATED APPLICATION

This application claims priority to Taiwanese Invention patent application No. 113127366, filed on Jul. 22, 2024, the entire disclosure of which is incorporated by reference herein.

FIELD

The disclosure relates to antenna technology, and more particularly to a magneto-electric dipole antenna and an antenna array using the same.

BACKGROUND

With the advancement of fifth-generation (5G) communication technology and the popularization of satellite communication technology, the demand for wireless communications grows, and the demand for antennas grows as well. Among various antenna technologies, magneto-electric dipole antennas are widely used.

Referring to FIG. 1, Taiwanese Invention Patent Publication No. TWI688163B discloses a Yagi-Uda antenna that includes a substrate 91, a dipole antenna 92, a reflector 93 and a plurality of directors 94. The dipole antenna 92, the reflector 93 and the directors 94 are disposed on an upper surface of the substrate 91, with the dipole antenna 92 disposed between the reflector 93 and a combination of the directors 94.

The Yagi-Uda antenna has a maximum gain of 9.76 dBi, which has room for improvement. In addition, the Yagi-Uda antenna has the problem of high back radiation.

SUMMARY

Therefore, an object of the disclosure is to provide a magneto-electric dipole antenna and an antenna array using the same. The magneto-electric dipole antenna can alleviate at least one of the drawbacks of the prior art.

According to an aspect of the disclosure, the magneto-electric dipole antenna includes a substrate module, a director, a reflector and a feeding module. The substrate module has an upper surface and a lower surface. The director is disposed on the upper surface of the substrate module. The reflector is disposed on the lower surface of the substrate module. The feeding module is disposed in the substrate module between the director and the reflector. When a to-be-outputted signal is fed to the feeding module, a forward radiation that transmits in a forward direction pointing from bottom to top is generated, a backward radiation that transmits in a backward direction reverse to the forward direction is generated and is reflected by the reflector, and the forward radiation and the backward radiation thus reflected are directed by the director so as to generate the electromagnetic wave.

According to another aspect of the disclosure, the antenna array includes a first antenna, a second antenna, a third antenna and a fourth antenna, each of which is the magneto-electric dipole antenna described above. The second antenna is aligned with the first antenna in a first direction, and is offset from the first antenna in a counterclockwise orientation by 90 degrees. The third antenna is aligned with the second antenna in a second direction, and is offset from the second antenna in a counterclockwise orientation by 90 degrees. The fourth antenna is aligned with the third antenna in the first direction, and is offset from the third antenna in a counterclockwise orientation by 90 degrees.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
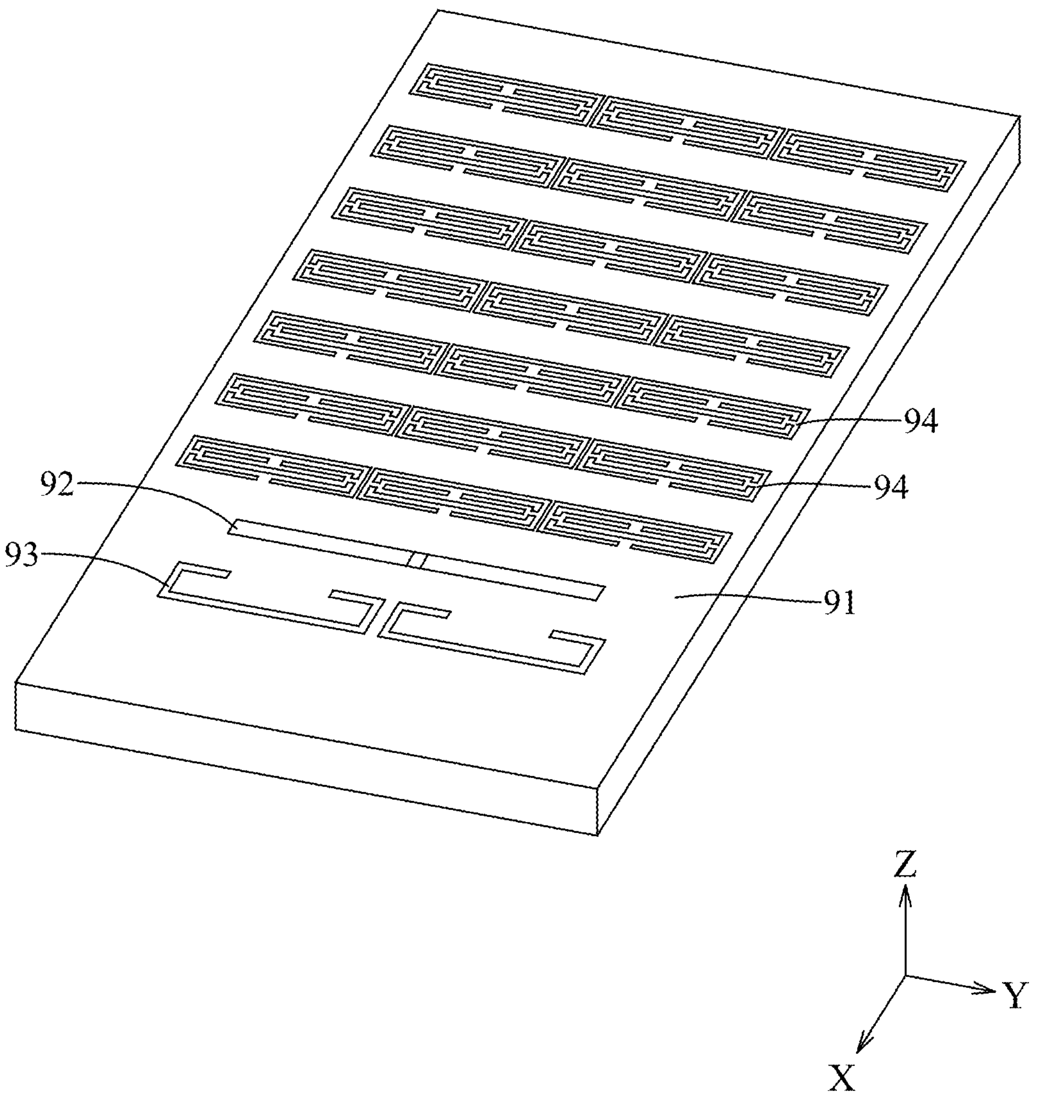
FIG. 1 PRIOR ART
FIG. 1 is a perspective view of a conventional Yagi-Uda antenna.
Figure 2:
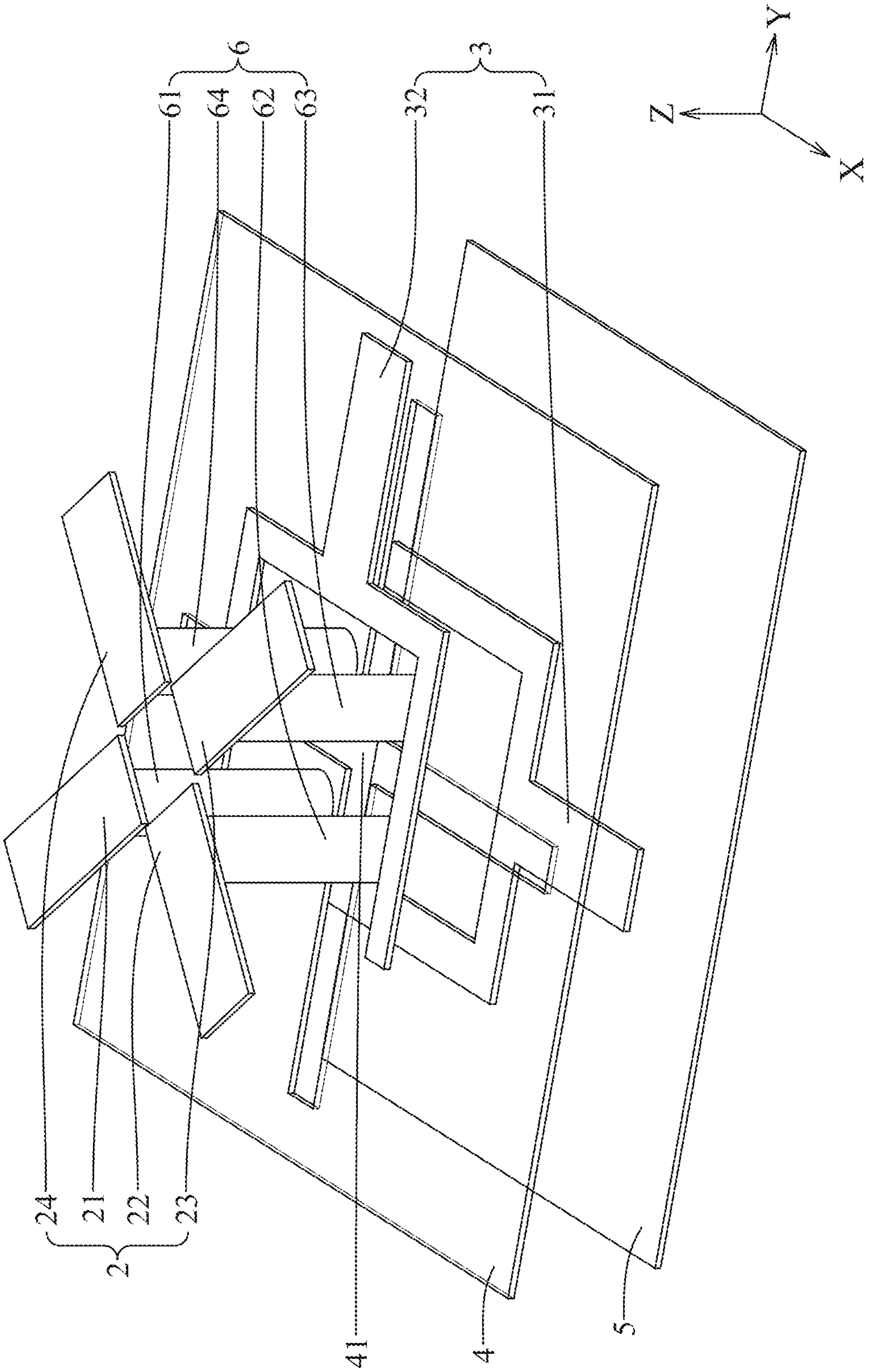
FIGS. 2 and 3 are fragmentary perspective views of an embodiment of a magneto-electric dipole antenna according to the disclosure.
Figure 3:
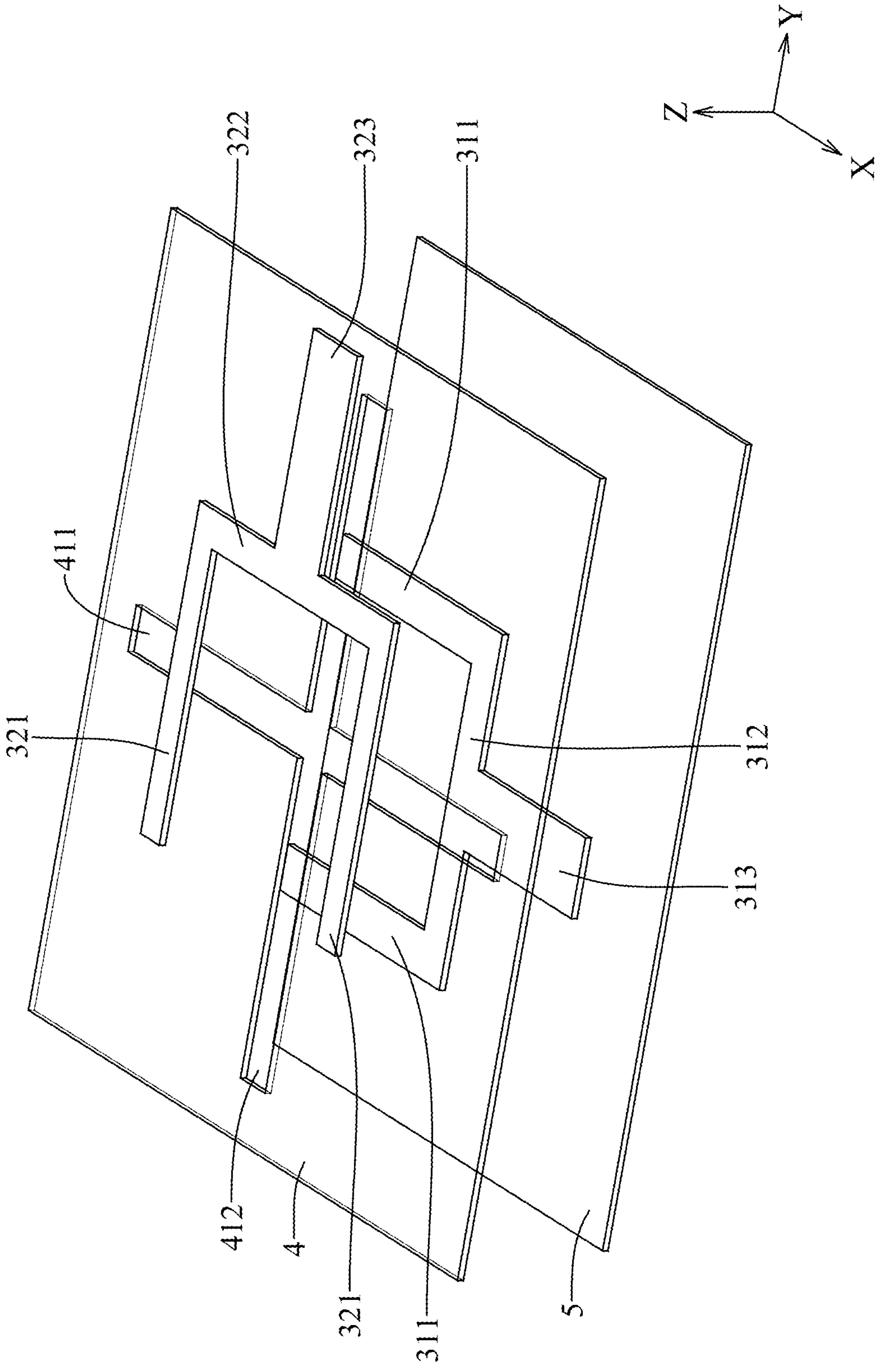

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features May be oriented differently (e.g., rotated 90 degrees or at other orientations) and the spatially relative terms used herein may be interpreted accordingly.

Referring to FIGS. 2 to 5, an embodiment of a magneto-electric dipole antenna according to the disclosure is adapted to output an electromagnetic wave, and includes a substrate module 1, a director 2, a feeding module 3, a ground layer 4, a reflector 5 and a conductive via module 6. It should be noted that, in FIG. 2, the substrate module 1 is omitted, and the ground layer 4 is depicted as transparent, so that the director 2, the feeding module 3, the ground layer 4, the reflector 5 and the conductive via module 6 can be clearly seen. It should also be noted that, in FIG. 3, the substrate module 1, the director 2 and the conductive via module 6 are omitted, and the ground layer 4 is depicted as transparent, so that the feeding module 3, the ground layer 4 and the reflector 5 can be clearly seen.

Figure 5:
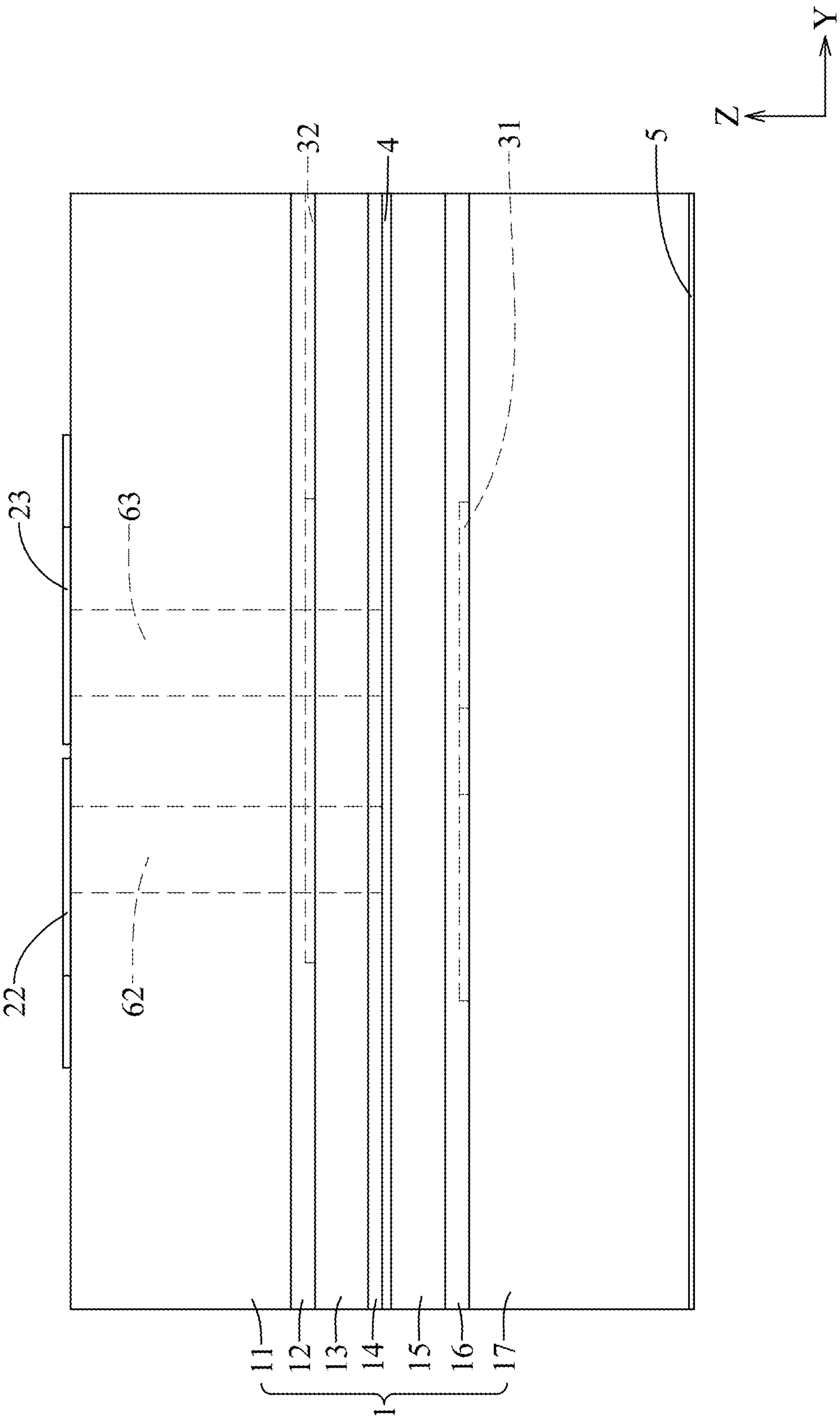
FIG. 5 is a side view of the embodiment of the magneto-electric dipole antenna.

As shown in FIG. 5, the substrate module 1 has an upper surface and a lower surface, and includes a first substrate 11, a first adhesive layer 12, a second substrate 13, a second adhesive layer 14, a third substrate 15, a third adhesive layer 16 and a fourth substrate 17. The first substrate 11, the first adhesive layer 12, the second substrate 13, the second adhesive layer 14, the third substrate 15, the third adhesive layer 16 and the fourth substrate 17 are stacked in the given order in a backward direction that is reverse to a Z-direction (also referred to as a forward direction) pointing from bottom to top, and are each made of a dielectric material. Centers of the first substrate 11, the first adhesive layer 12, the second substrate 13, the second adhesive layer 14, the third substrate 15, the third adhesive layer 16 and the fourth substrate 17 are aligned in a line that passes a center of the upper surface of the substrate module 1 and a center of the lower surface of the substrate module 1.

In this embodiments, the first substrate 11 and the fourth substrate 17 have the same thickness in the Z-direction. The second substrate 13 and the third substrate 15 have the same thickness in the Z-direction. The first adhesive layer 12, the second adhesive layer 14 and the third adhesive layer 16 have the same thickness in the Z-direction. The thickness of the second substrate 13 and the third substrate 15 is smaller than the thickness of the first substrate 11 and the fourth substrate 17, and is greater than the thickness of the first adhesive layer 12, the second adhesive layer 14 and the third adhesive layer 16.

The reflector 5 is made of metal, has a rectangular shape, and is disposed on a lower surface of the fourth substrate 17 that serves as the lower surface of the substrate module 1. A length of the reflector 5 in an X-direction (also referred to as a first direction) that is, for example, perpendicular to the Z-direction is smaller than a length of the reflector 5 in a Y-direction (also referred to as a second direction) that is, for example, perpendicular to the Z-direction and the X-direction.

The director 2 includes a first director portion 21, a second director portion 22, a third director portion 23 and a fourth director portion 24. Each of the first director portion 21, the second director portion 22, the third director portion 23 and the fourth director portion 24 is made of metal, has a rectangular shape, and is disposed on an upper surface of the first substrate 11 that serves as the upper surface of the substrate module 1. The first director portion 21, the second director portion 22, the third director portion 23 and the fourth director portion 24 are arranged around a center of the upper surface of the first substrate 11 in the form of a cross, and are spaced apart from each other so as to provide a substantially square space at a center of the cross. The first director portion 21 and the third director portion 23 lie in a first line that passes the center of the upper surface of the first substrate 11 and that is offset from the X-direction by 45 degrees. The second director portion 22 and the fourth director portion 24 lie in a second line that passes the center of the upper surface of the first substrate 11 and that is perpendicular to the first line. Each of the first director portion 21, the second director portion 22, the third director portion 23 and the fourth director portion 24 serves as an electric dipole.

The ground layer 4 is made of metal, is disposed on an upper surface of the third substrate 15 (i.e., being disposed in the substrate module 11 between the director 2 and the reflector 5), and includes a slot 41 having a cross shape. The slot 41 includes a first slot portion 411 and a second slot portion 412 that are in spatial communication with each other. The first slot portion 411 extends in the X-direction. The second slot portion 412 extends in the Y-direction. A center of the first slot portion 411 and a center of the second slot portion 412 coincide with each other, and are aligned in the line that passes the center of the upper surface of the substrate module 1 and the center of the lower surface of the substrate module 1.

The feeding module 3 is disposed in the substrate module 1, is between the director 2 and the reflector 5, and includes a first feed-in line 31 and a second feed-in line 32.

The first feed-in line 31 is made of metal, and is disposed on an upper portion of the fourth substrate 17 (i.e., being disposed between the ground layer 4 and the reflector 5), and includes two first line segments 311, a second line segment 312 and a third line segment 313. The first line segments 311 extend along the X-direction, and are arranged side by side along the Y-direction. The second line segment 312 extends along the Y-direction, and has two end terminals that are respectively connected to two respective end terminals of the first line segments 311. The third line segment 313 extends along the X-direction, is arranged opposite to the first line segments 311 with respect to the second line segment 312, and is connected to an intermediate terminal of the second line segment 312.

The second feed-in line 32 is made of metal, and is disposed on an upper surface of the second substrate 13 (i.e., being disposed between the director 2 and the ground layer 4), and includes two fourth line segments 321, a fifth line segment 322 and a sixth line segment 323. The fourth line segments 321 extend along the Y-direction, and are arranged side by side along the X-direction. The fifth line segment 322 extends along the X-direction, and has two end terminals that are respectively connected to two respective end terminals of the fourth line segments 321. The sixth line segment 323 extends along the Y-direction, is arranged opposite to the fourth line segments 321 with respect to the fifth line segment 322, and is connected to an intermediate terminal of the fifth line segment 322.

In this embodiment, the first director portion 21, the second director portion 22, the third director portion 23, the fourth director portion 24, the ground layer 4, the reflector 5, the first feed-in line 31 and the second feed-in line 32 have the same thickness in the Z-direction. The thickness of the first director portion 21, the second director portion 22, the third director portion 23, the fourth director portion 24, the ground layer 4, the reflector 5, the first feed-in line 31 and the second feed-in line 32 is smaller than the thickness of the first adhesive layer 12, the second adhesive layer 14 and the third adhesive layer 16.

The conductive via module 6 includes a first conductive via 61, a second conductive via 62, a third conductive via 63 and a fourth conductive via 64. Each of the first conductive via 61, the second conductive via 62, the third conductive via 63 and the fourth conductive via 64 is made of metal, has a cylinder shape, and penetrates the first substrate 11, the first adhesive layer 12, the second substrate 13 and the second adhesive layer 14 in the given order along the backward direction reverse to the Z-direction.

The first conductive via 61 is disposed within a projection of the first director portion 21 in the backward direction. The second conductive via 62 is disposed within a projection of the second director portion 22 in the backward direction. The third conductive via 63 is disposed within a projection of the third director portion 23 in the backward direction. The fourth conductive via 64 is disposed within a projection of the fourth director portion 24 in the backward direction.

The first conductive via 61 is connected to an end portion of the first director portion 21 that is adjacent to the center of the upper surface of the first substrate 11, and is further connected to the ground layer 5. The second conductive via 62 is connected to an end portion of the second director portion 22 that is adjacent to the center of the upper surface of the first substrate 11, and is further connected to the ground layer 5. The third conductive via 63 is connected to an end portion of the third director portion 23 that is adjacent to the center of the upper surface of the first substrate 11, and is further connected to the ground layer 5. The fourth conductive via 64 is connected to an end portion of the fourth director portion 24 that is adjacent to the center of the upper surface of the first substrate 11, and is further connected to the ground layer 5. Each of the first conductive via 61, the second conductive via 62, the third conductive via 63 and the fourth conductive via 64 serves as a magnetic dipole.

When a to-be-outputted signal is fed to the first feed-in line 31 and the second feed-in line 32 of the feeding module 3, the to-be-outputted signal is electromagnetically coupled to the slot 41 of the ground layer 4, the slot 41 of the ground layer 4 generates a forward radiation that transmits in the forward direction (i.e., the Z-direction) to the director 2 and a backward radiation that transmits in the backward direction (reverse to the forward direction) to the reflector 5, the reflector 5 reflects the backward radiation back to the director 2, and the director 2 directs the forward radiation and the backward radiation so as to generate the electromagnetic wave that transmits in the forward direction.

In this embodiment, the magneto-electric dipole antenna is configured to operate in a frequency band of from 27.5 GHz to 30 GHz (i.e., an operating frequency band of the magneto-electric dipole antenna is from 27.5 GHZ to 30 GHz).

Figure 4:
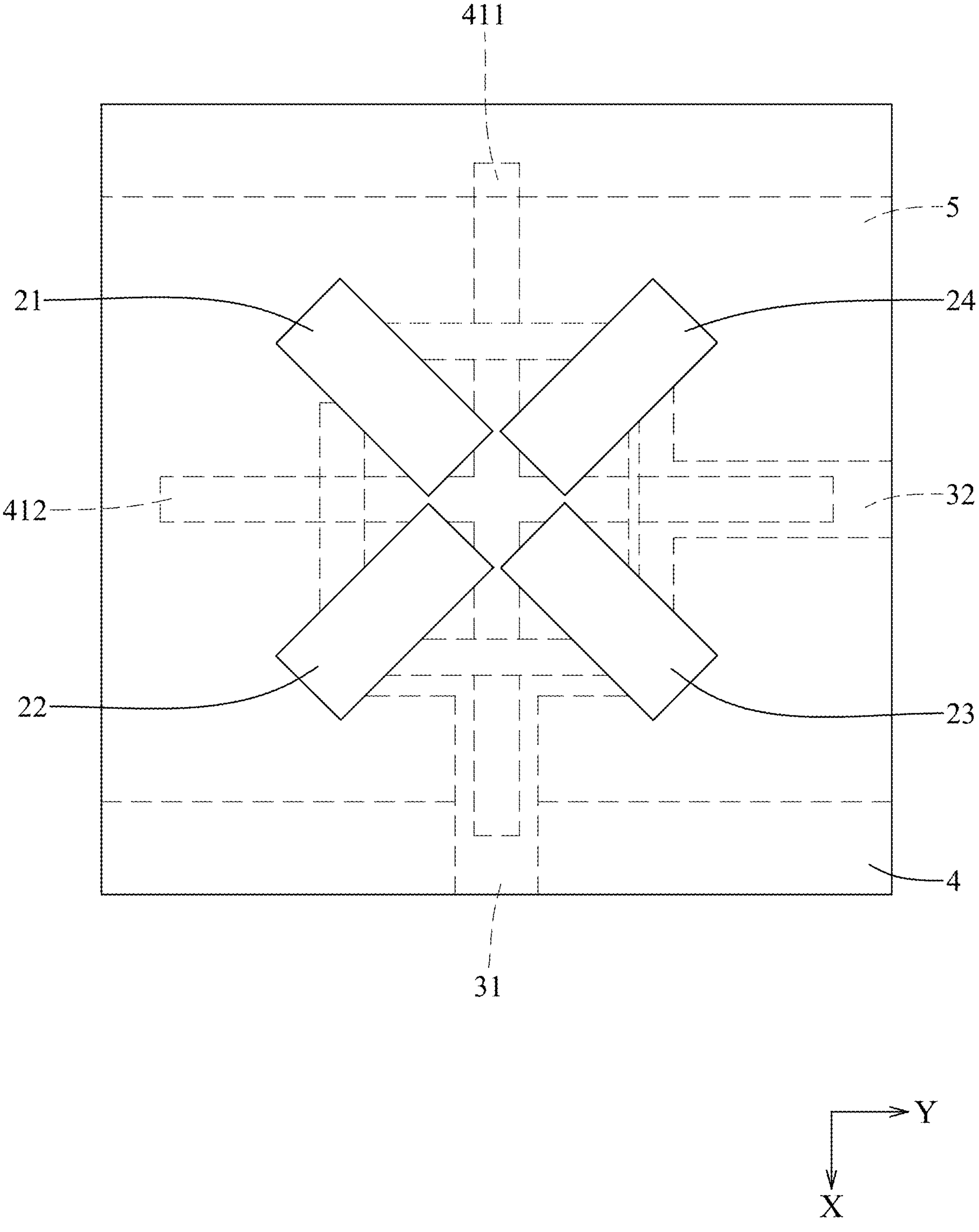
FIG. 4 is a top view of the embodiment of the magneto-electric dipole antenna.
Figure 6:
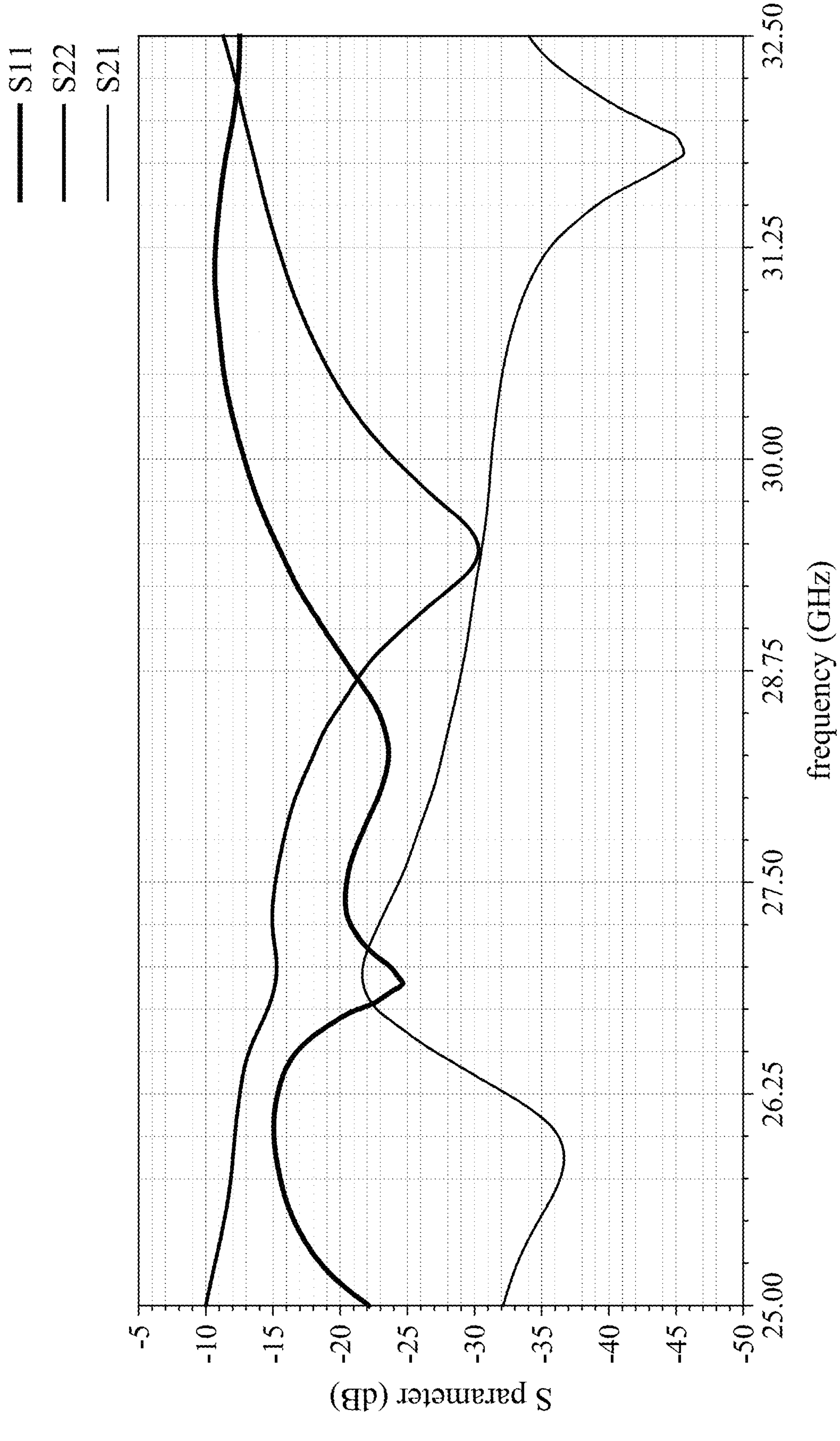
FIG. 6 is a plot illustrating various scattering parameters (S parameters) of the embodiment of the magneto-electric dipole antenna.

FIG. 6 is a plot illustrating scattering parameters (S11, S22, S21) of the magneto-electric dipole antenna of this embodiment in a frequency range of from 25 GHz to 32.5 GHz. Referring to FIGS. 4 and 6, the scattering parameter (S11) is a reflection coefficient at the first feed-in line 31. The scattering parameter (S22) is a reflection coefficient at the second feed-in line 32. Each of the scattering parameters (S11, S22) is smaller than −10 dB in the operating frequency band of the magneto-electric dipole antenna. The scattering parameter (S21) is a transmission coefficient that is related to isolation between the first feed-in line 31 and the second feed-in line 32, and is smaller than −20 dB in the operating frequency band of the magneto-electric dipole antenna.

Figure 7:
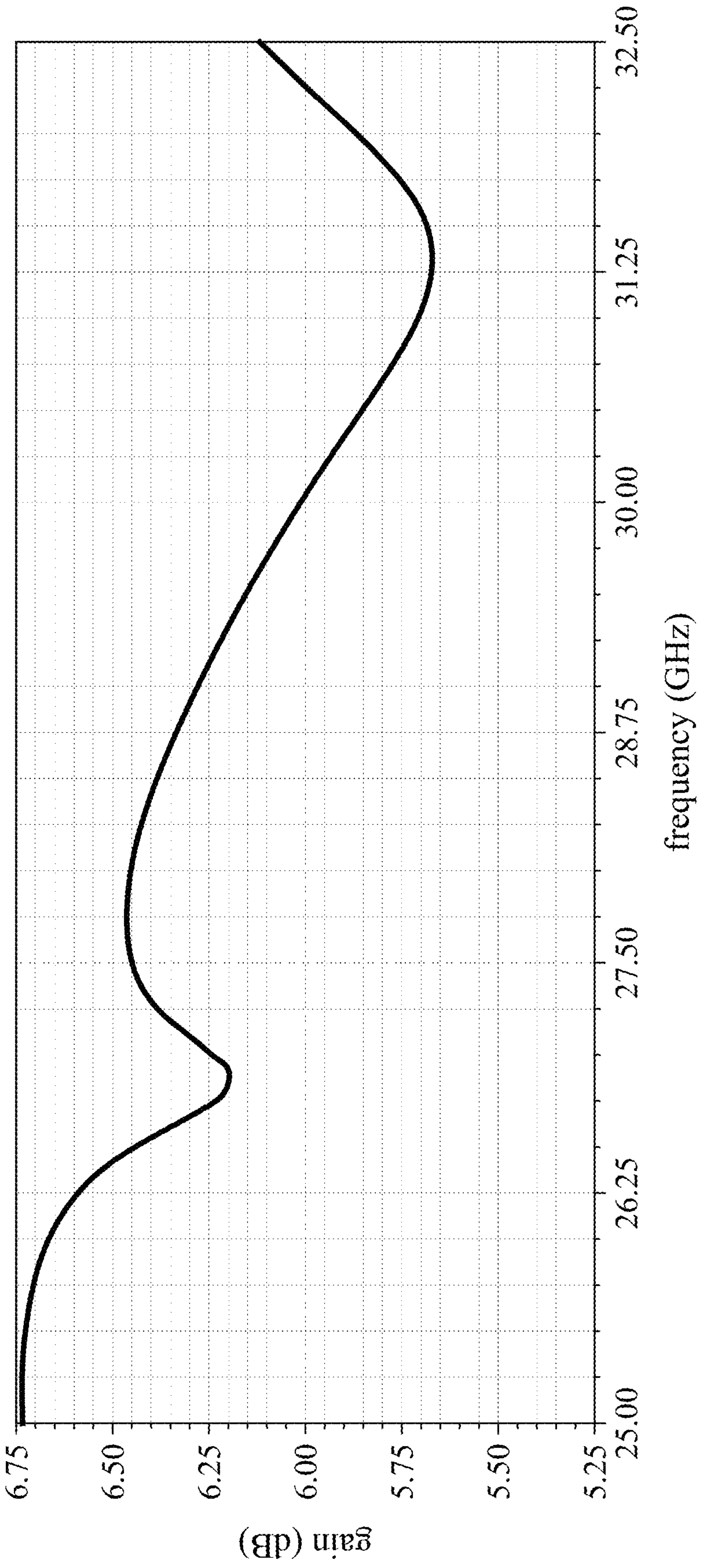
FIG. 7 is a plot illustrating a gain of the embodiment of the magneto-electric dipole antenna.

FIG. 7 is a plot illustrating a gain of the magneto-electric dipole antenna of this embodiment in a frequency range of from 25 GHz to 32.5 GHZ. As shown in FIG. 7, the gain of the magneto-electric dipole antenna is greater than 6.0 dB in the operating frequency band of the magneto-electric dipole antenna.

Figure 8:
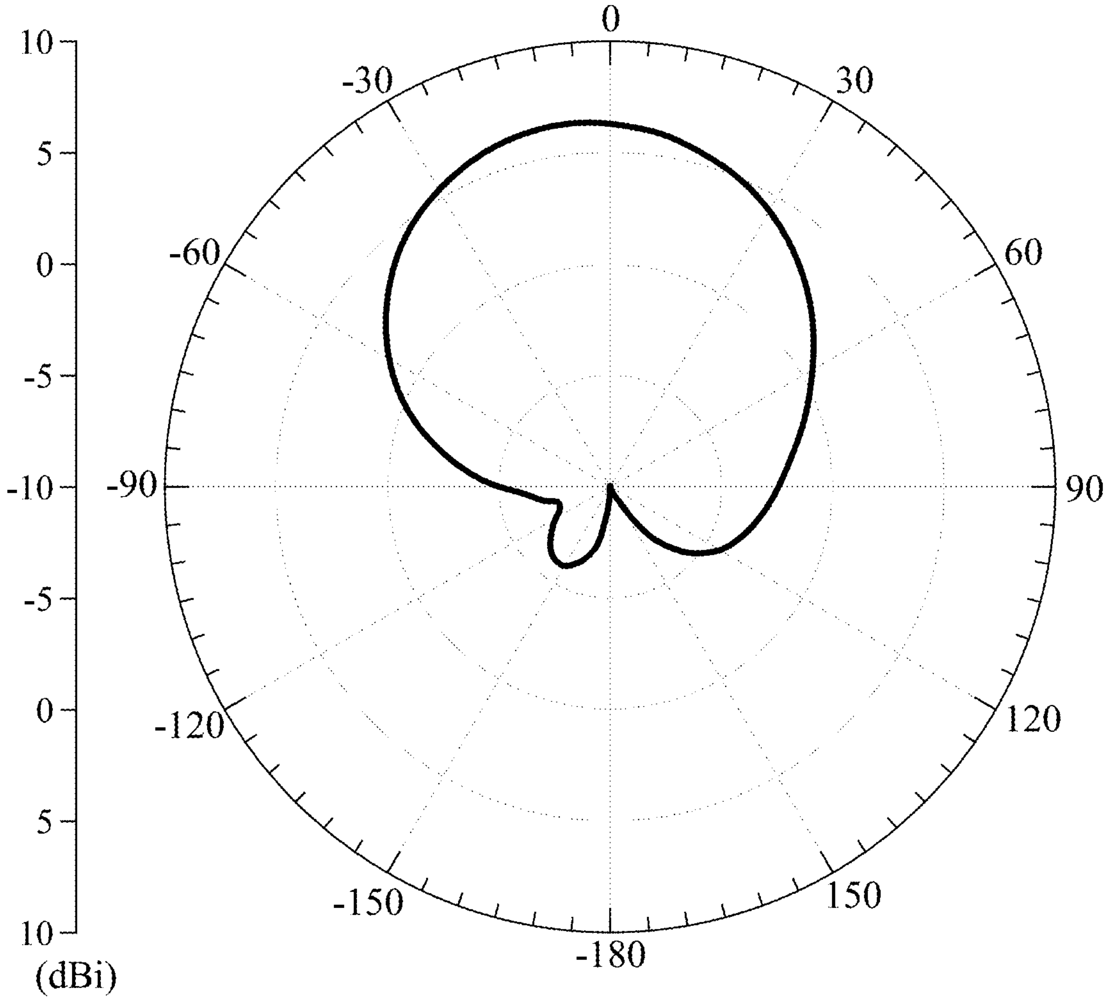
FIG. 8 is a plot illustrating a radiation pattern of the embodiment of the magneto-electric dipole antenna.

FIG. 8 is a plot illustrating a radiation pattern of the magneto-electric dipole antenna of this embodiment at a frequency of 29 GHz. As shown in FIG. 8, the magneto-electric dipole antenna has a gain of 6.28 dBi at an angle of 0 degrees, a gain of −9.12 dBi at an angle of 180 degrees, and a front-to-back ratio of 15.4 dBi.

Figure 9:
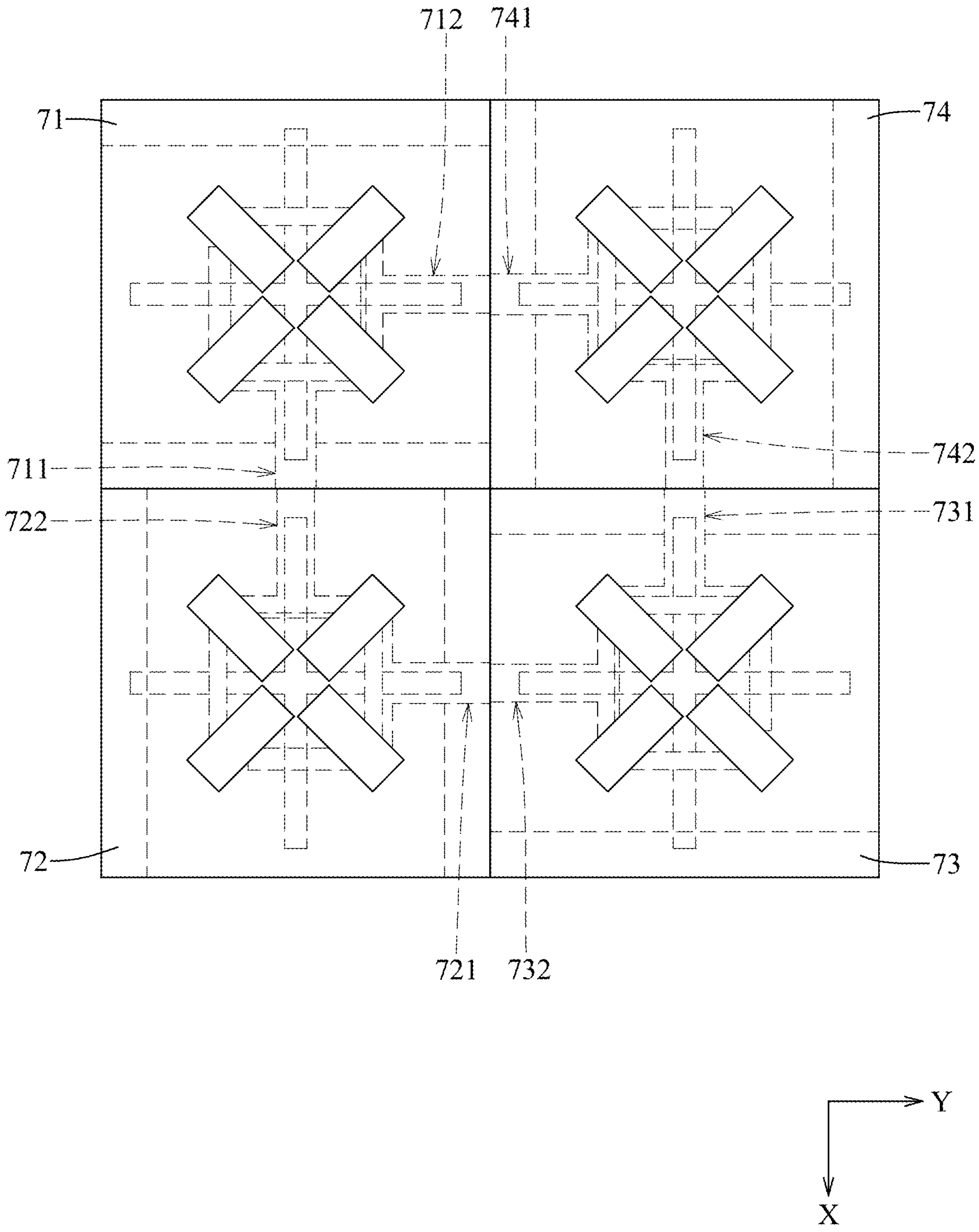
FIG. 9 is a top view of an embodiment of an antenna array according to the disclosure.

Referring to FIG. 9, an embodiment of an antenna array according to the disclosure includes a first antenna 71, a second antenna 72, a third antenna 73 and a fourth antenna 74, each of which is the magneto-electric dipole antenna described above. The first antenna 71 has a first input port 711 and a second input port 712 that respectively correspond to the first feed-in line 31 and the second feed-in line 32 (see FIG. 4) of the first antenna 711. The second antenna 72 has a third input port 721 and a fourth input port 722 that respectively correspond to the first feed-in line 31 and the second feed-in line 32 (see FIG. 4) of the second antenna 72. The third antenna 73 has a fifth input port 731 and a sixth input port 732 that respectively correspond to the first feed-in line 31 and the second feed-in line 32 (see FIG. 4) of the third antenna 73. The fourth antenna 74 has a seventh input port 741 and an eighth input port 742 that respectively correspond to the first feed-in line 31 and the second feed-in line 32 (see FIG. 4) of the fourth antenna 74.

The first antenna 71, the second antenna 72, the third antenna 73 and the fourth antenna 74 are arranged in a 2×2 matrix in the stated order in a counterclockwise orientation. Specifically, the second antenna 72 is aligned with the first antenna 71 in the X-direction, and is offset from the first antenna 71 in a counterclockwise orientation by 90 degrees. The third antenna 73 is aligned with the second antenna 72 in the Y-direction, and is offset from the second antenna 72 in a counterclockwise orientation by 90 degrees. The fourth antenna 74 is aligned with the third antenna 73 in the X-direction, and is offset from the third antenna 73 in a counterclockwise orientation by 90 degrees.

In this embodiment, the antenna array is configured to operate in a frequency band of from 27.5 GHz to 30 GHz (i.e., an operating frequency band of the antenna array is from 27.5 GHz to 30 GHZ).

Figure 10:
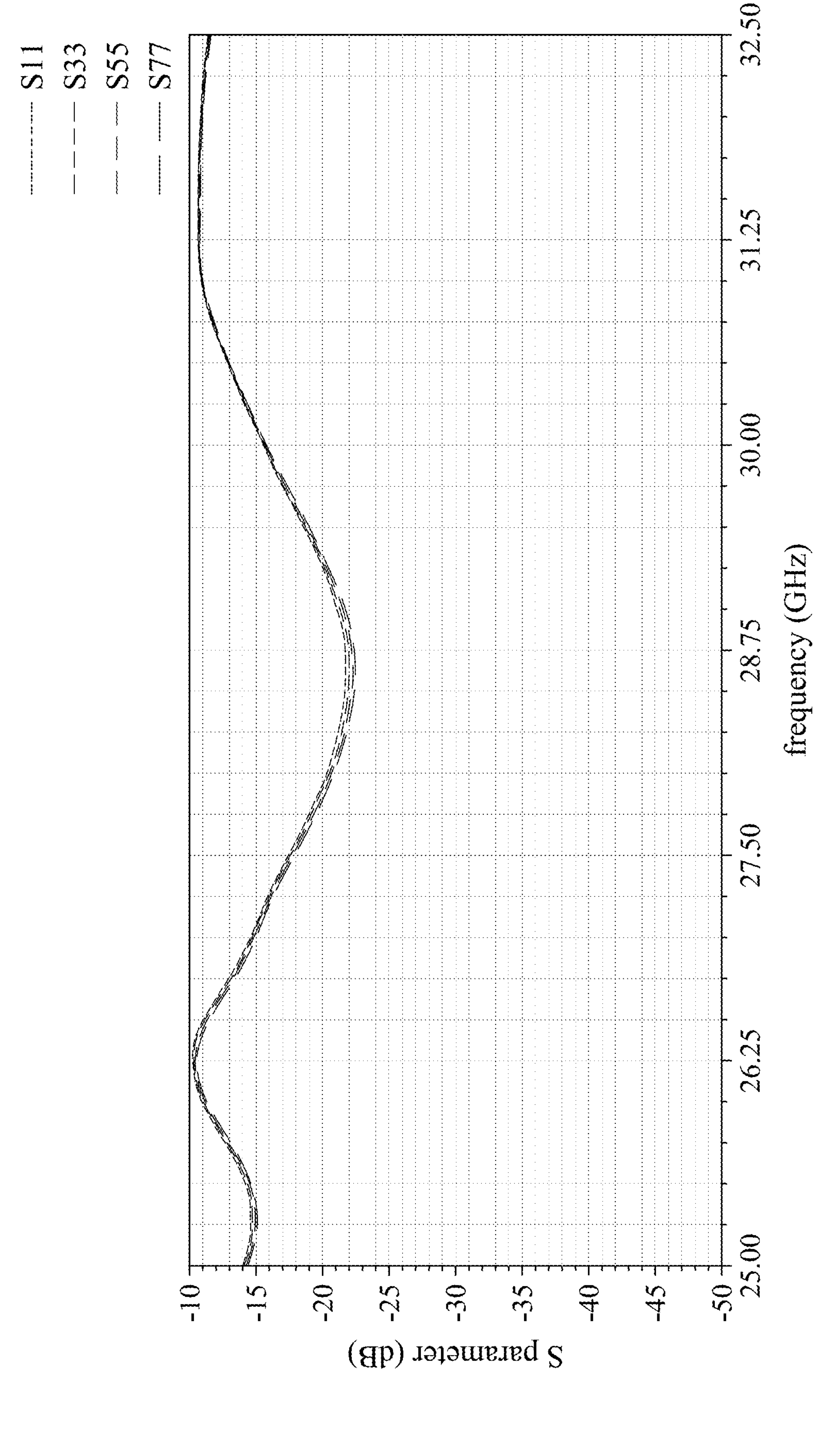
FIGS. 10 to 13 are plots illustrating various scattering parameters of the embodiment of the antenna array.
Figure 11:
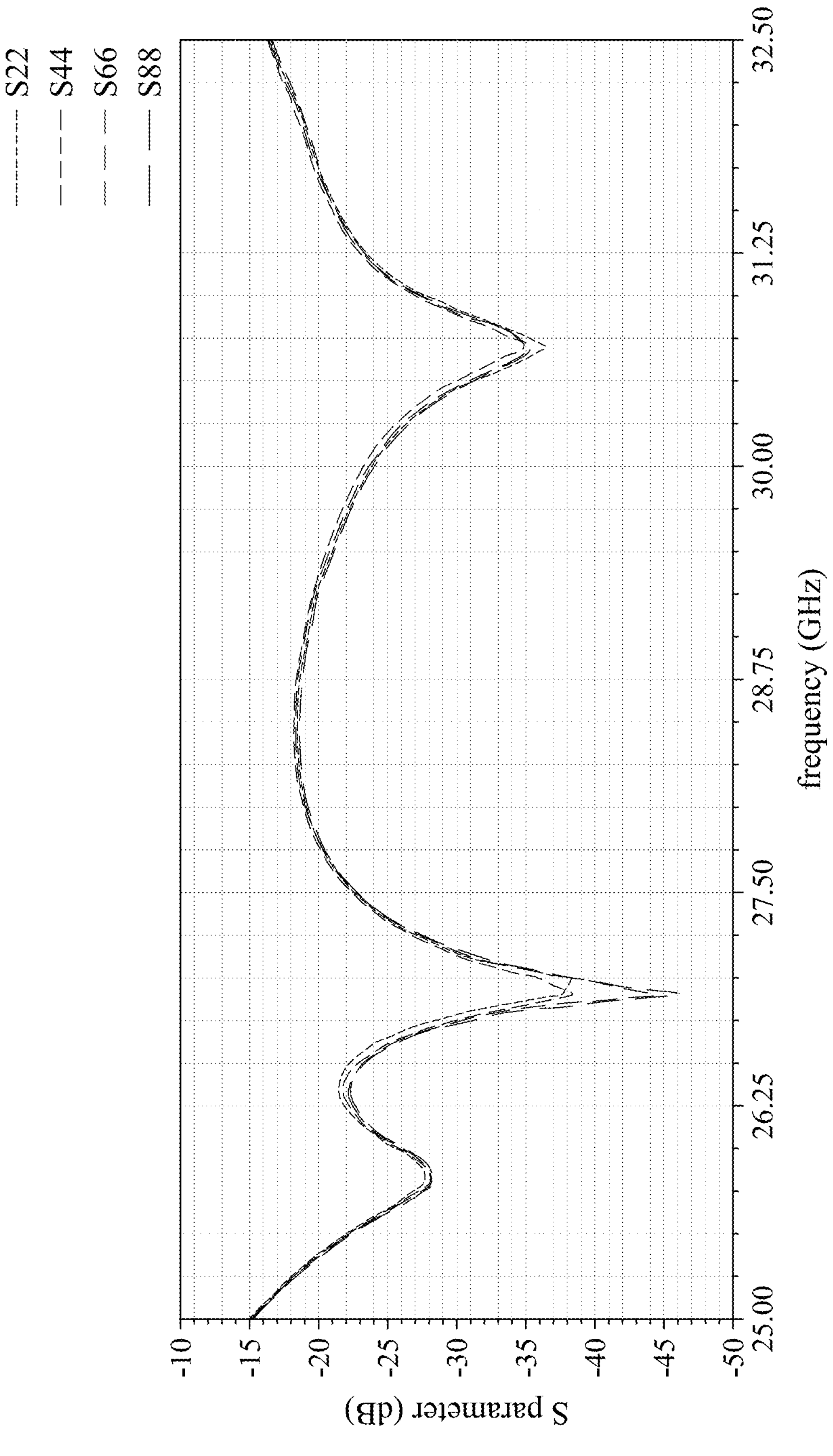

FIG. 10 is a plot illustrating scattering parameters (S11, S33, S55, S77) of the antenna array of this embodiment in a frequency range of from 25 GHZ to 32.5 GHz. FIG. 11 is a plot illustrating scattering parameters (S22, S44, S66, S88) of the antenna array of this embodiment in a frequency range of from 25 GHZ to 32.5 GHz. Referring to FIGS. 9 to 11, the scattering parameter (S11) is a reflection coefficient at the first input port 711. The scattering parameter (S22) is a reflection coefficient at the second input port 712. The scattering parameter (S33) is a reflection coefficient at the third input port 721. The scattering parameter (S44) is a reflection coefficient at the fourth input port 722. The scattering parameter (S55) is a reflection coefficient at the fifth input port 731. The scattering parameter (S66) is a reflection coefficient at the sixth input port 732. The scattering parameter (S77) is a reflection coefficient at the seventh input port 741. The scattering parameter (S88) is a reflection coefficient at the eighth input port 742. Each of the scattering parameters (S11, S22, S33, S44, S55, S66, S77, S88) is smaller than-15 dB in the operating frequency band of the antenna array.

Figure 12:
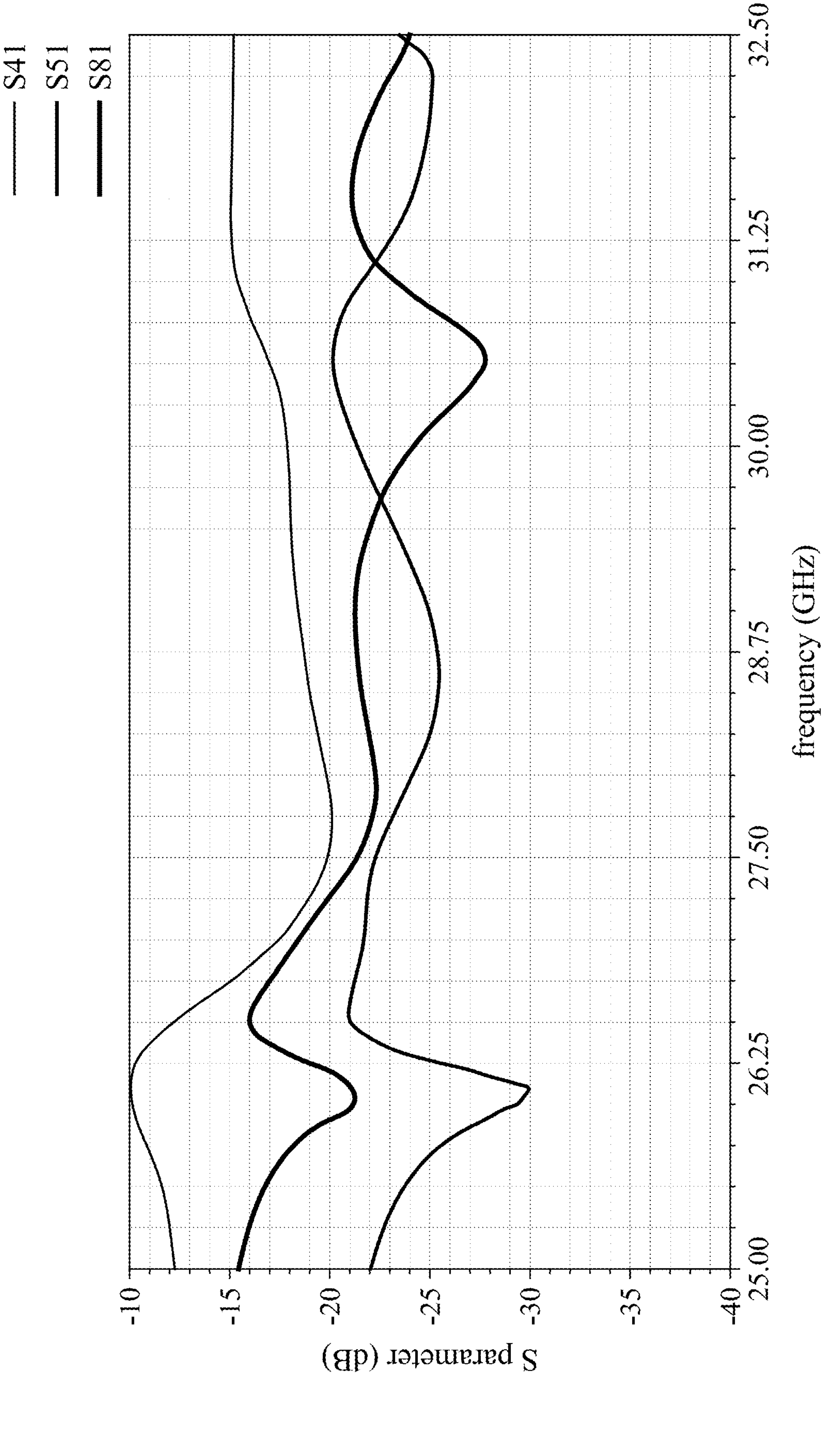

FIG. 12 is a plot illustrating scattering parameters (S41, S51, S81) of the antenna array of this embodiment in a frequency range of from 25 GHz to 32.5 GHz. Referring to FIGS. 9 and 12, the scattering parameter (S41) is a transmission coefficient that is related to isolation between the first input port 711 and the fourth input port 722. The scattering parameter (S51) is a transmission coefficient that is related to isolation between the first input port 711 and the fifth input port 731. The scattering parameter (S81) is a transmission coefficient that is related to isolation between the first input port 711 and the eighth input port 742. The first input port 711, the fourth input port 722, the fifth input port 731 and the eighth input port 742 have the same polarization. Each of the scattering parameters (S41, S51, S81) is smaller than −15 dB in the operating frequency band of the antenna array.

Figure 13:
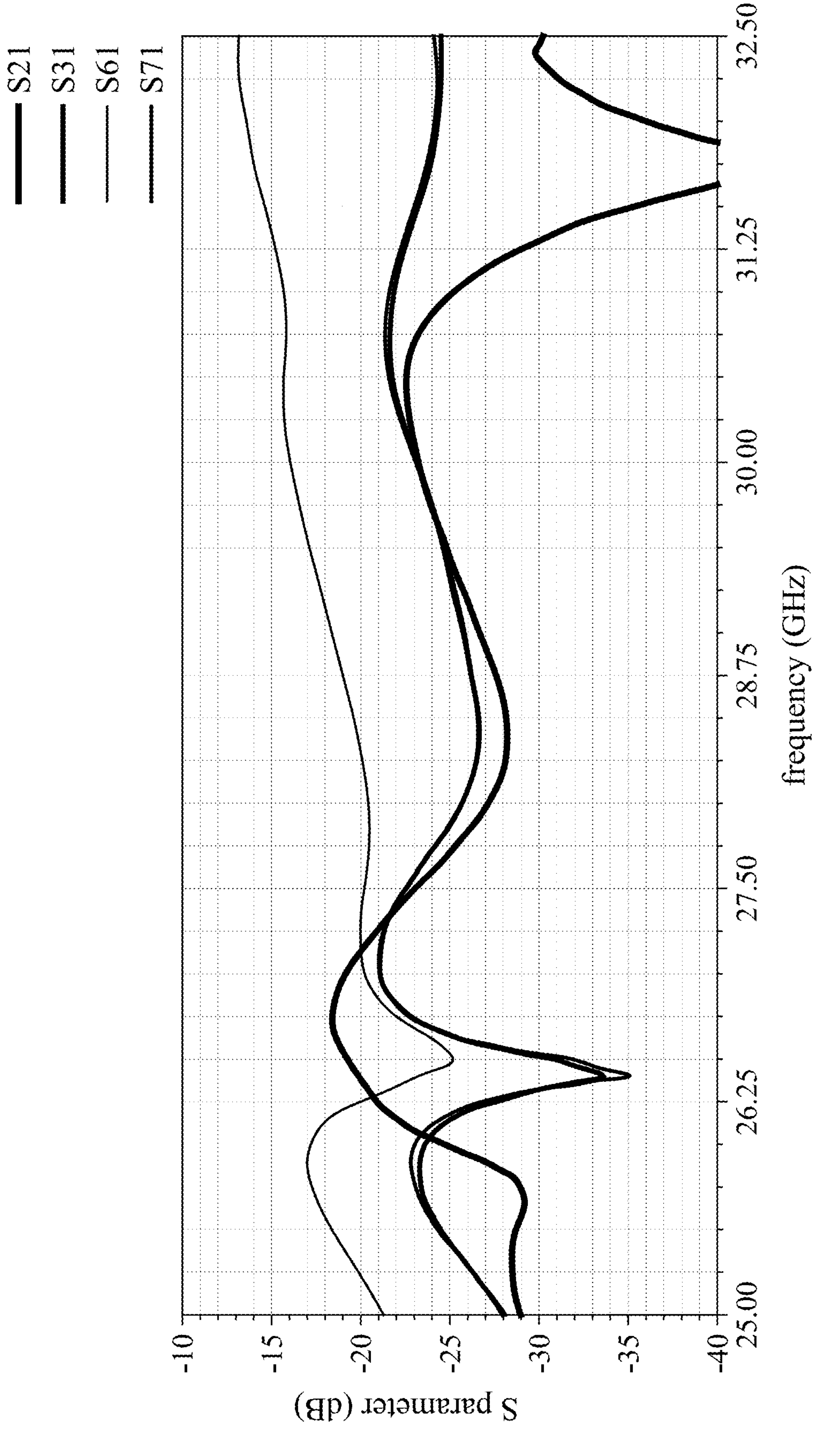

FIG. 13 is a plot illustrating scattering parameters (S21, S31, S61, S71) of the antenna array of this embodiment in a frequency range of from 25 GHZ to 32.5 GHz. Referring to FIGS. 9 and 13, the scattering parameter (S21) is a transmission coefficient that is related to isolation between the first input port 711 and the second input port 712. The scattering parameter (S31) is a transmission coefficient that is related to isolation between the first input port 711 and the third input port 721. The scattering parameter (S61) is a transmission coefficient that is related to isolation between the first input port 711 and the sixth input port 732. The scattering parameter (S71) is a transmission coefficient that is related to isolation between the first input port 711 and the seventh input port 741. The second input port 712, the third input port 721, the sixth input port 732 and the seventh input port 741 have the same polarization that is different from the polarization of the first input port 711. Each of the scattering parameters (S21, S31, S61, S71) is smaller than −15 dB in the operating frequency band of the antenna array.

Figure 14:
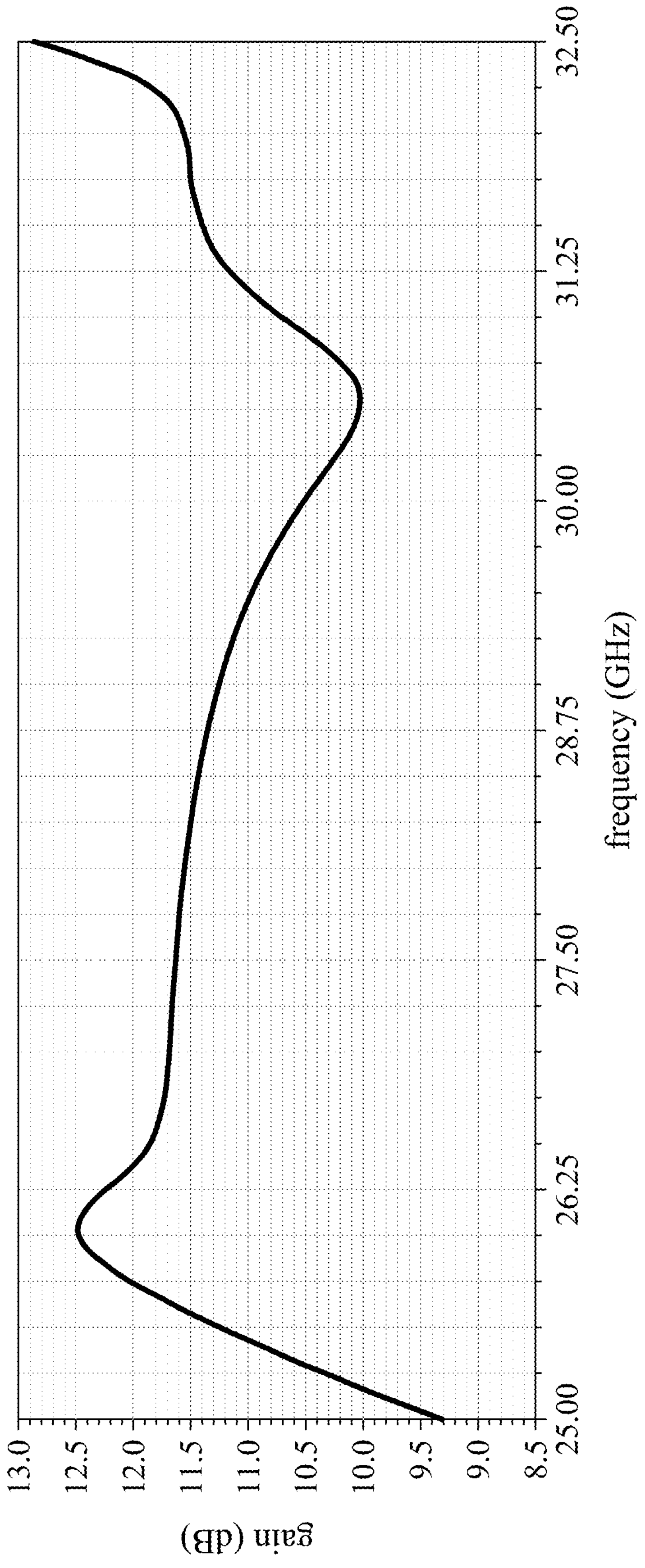
FIG. 14 is a plot illustrating a gain of the embodiment of the antenna array.

FIG. 14 is a plot illustrating a gain of the antenna array of this embodiment in a frequency range of from 25 GHz to 32.5 GHz. As shown in FIG. 14, the gain of the antenna array is greater than 10.5 dB in the operating frequency band of the antenna array.

Figure 15:
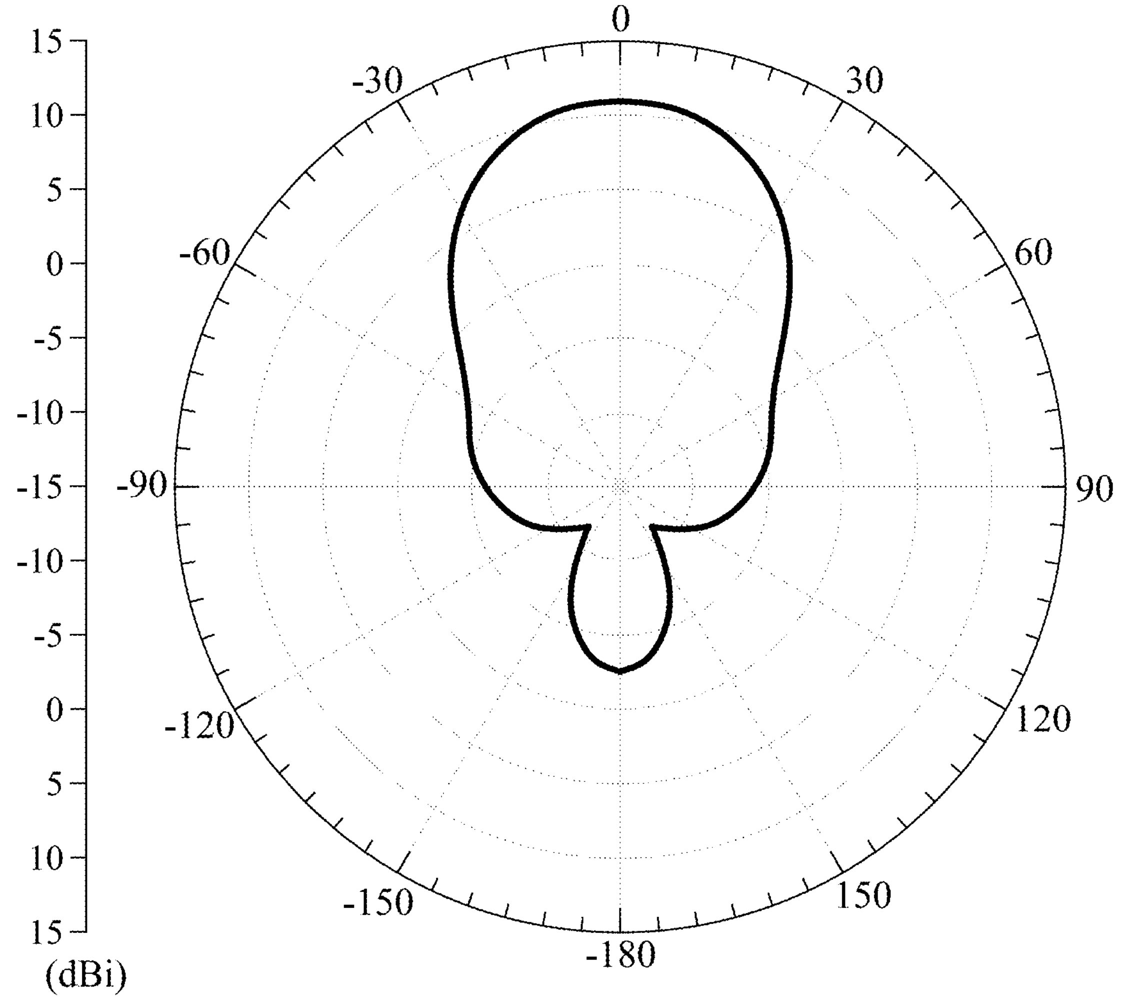
FIG. 15 is a plot illustrating a radiation pattern of the embodiment of the antenna array.

FIG. 15 is a plot illustrating a radiation pattern of the antenna array of this embodiment at a frequency of 29 GHz. As shown in FIG. 15, the antenna array has a gain of 11.25 dBi at an angle of 0 degrees, a gain of −2.58 dBi at an angle of 180 degrees, and a front-to-back ratio of 13.83 dBi.

In view of the above, for the embodiment of the magneto-electric dipole antenna depicted in FIGS. 2 to 5, by virtue of the reflector 5 reflecting the backward radiation and the director 2 directing the forward radiation and the reflected backward radiation, the gain of the magneto-electric dipole antenna can be enhanced, and back radiation of the magneto-electric dipole antenna can be reduced. In addition, for the embodiment of the antenna array depicted in FIG. 9, since multiple magneto-electric dipole antennas are used, the gain of the antenna array can be further enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A magneto-electric dipole antenna adapted to output an electromagnetic wave, and comprising:

a substrate module having an upper surface and a lower surface;

a director disposed on said upper surface of said substrate module;

a reflector disposed on said lower surface of said substrate module;

a feeding module disposed in said substrate module between said director and said reflector; and a ground layer that is disposed in said substrate module between said director and said reflector, and that is provided with a slot, wherein, when a to-be-outputted signal is fed to said feeding module, a forward radiation that transmits in a forward direction pointing from bottom to top is generated, a backward radiation that transmits in a backward direction reverse to the forward direction is generated and is reflected by said reflector, and the forward radiation and the backward radiation thus reflected are directed by said director so as to generate the electromagnetic wave, wherein the slot includes a first slot portion and a second slot portion that are in spatial communication with each other, wherein the first slot portion extends along a first direction, wherein the second slot portion extends along a second direction, wherein a center of the first slot portion and a center of the second slot portion are aligned in a line that passes a center of said upper surface of said substrate module and a center of said lower surface of said substrate module, wherein said feeding module includes a first feed-in line and a second feed-in line, wherein said first feed-in line is disposed between said ground layer and said reflector, and wherein said second feed-in line is disposed between said director and said ground layer.

2. The magneto-electric dipole antenna as claimed in claim 1, wherein:

said first feed-in line includes two first line segments, a second line segment and a third line segment;

said first line segments extend along the first direction, and are arranged side by side along the second direction;

said second line segment extends along the second direction, and has two end terminals that are respectively connected to two respective end terminals of said first line segments; and said third line segment extends along the first direction, is arranged opposite to said first line segments with respect to said second line segment, and is connected to an intermediate terminal of said second line segment.

3. The magneto-electric dipole antenna as claimed in claim 2, wherein:

said second feed-in line includes two fourth line segments, a fifth line segment and a sixth line segment;

said fourth line segments extend along the second direction, and are arranged side by side along the first direction;

said fifth line segment extends along the first direction, and has two end terminals that are respectively connected to two respective end terminals of said fourth line segments; and said sixth line segment extends along the second direction, is arranged opposite to said fourth line segments with respect to said fifth line segment, and is connected to an intermediate terminal of said fifth line segment.

4. The magneto-electric dipole antenna as claimed in claim 1, wherein:

said director includes four director portions that are arranged around the center of said upper surface of said substrate module and that are spaced apart from each other;

two of said director portions lie in a first line that passes the center of said upper surface of said substrate module; and another two of said director portions lie in a second line that passes the center of said upper surface of said substrate module.

5. The magneto-electric dipole antenna as claimed in claim 4, further comprising:

four conductive vias, each of which penetrates said substrate module along the backward direction, and is connected to a respective one of said director portions and to said ground layer.

6. The magneto-electric dipole antenna as claimed in claim 5, wherein:

each of said director portions serves as an electric dipole; and each of said conductive vias serves as a magnetic dipole.

7. An antenna array comprising:

a first antenna, a second antenna, a third antenna and a fourth antenna, each of which is a magneto-electric dipole antenna according to claim 1;

wherein said second antenna is aligned with said first antenna in an X-direction, and is offset from said first antenna in a counterclockwise orientation by 90 degrees;

wherein said third antenna is aligned with said second antenna in a Y-direction, and is offset from said second antenna in a counterclockwise orientation by 90 degrees; and wherein said fourth antenna is aligned with said third antenna in the X-direction, and is offset from said third antenna in a counterclockwise orientation by 90 degrees.

* * * * *